June 4, 1929. A. BONNEFONT 1,715,736
RADIO INSTRUMENT CONTROLLING DEVICE
Filed April 1, 1927
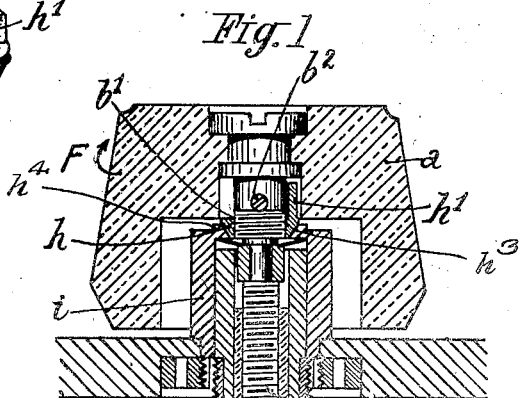
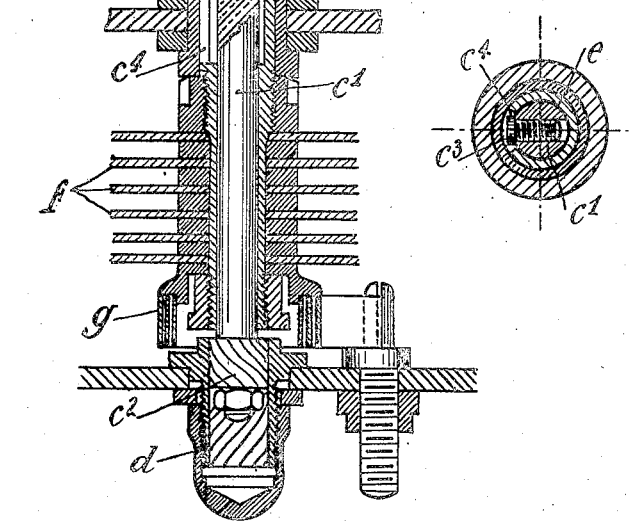
Inventor
Antoine Bonnefont,
By [signature]
Atty Patented June 4, 1929.

1,715,736

UNITED STATES PATENT OFFICE.

ANTOINE BONNEFONT, OF PARIS, FRANCE.

RADIO INSTRUMENT CONTROLLING DEVICE.

Application filed April 1, 1927, Serial No. 180,249, and in France April 12, 1926.

My invention relates to improvements in manually operated control shafts for adjusting instruments such as radio variable condensers, variometers or analogous instruments.

One of the objects of the invention is to provide the said control shaft with a speed-reducing device which may be readily entirely disposed on the same axis as the control shaft.

Another object of the invention is to provide a control shaft of the character indicated with a speed reducing device which shall give one reduction in speed when said shaft is manipulated by its operating knob in one direction and another speed reduction when said knob is manipulated in the opposite direction.

My invention is further comprised in certain novel forms of construction and combination of parts, the objects of which are to provide reliable devices for the purposes stated and to cheapen the cost of manufacture, all of which will hereinafter be fully described and claimed.

Other objects of the invention will be obvious to those skilled in the art to which it relates.

In the accompanying drawings which form part of this specification—

Figure 1 is a vertical sectional view of my device.

Fig. 2 is a perspective detail view; and

Fig. 3 is a section on the line X—X of Fig. 1.

As shown in the drawings, the shaft $b$ is provided with a screw thread $b^3$ and is secured to an operating knob $a$ at the top of the shaft and said shaft is provided with a second screw thread $b^1$, whose pitch is somewhat smaller than that of the screw thread $b^3$, and which is screwed into a ring $h$ (Figs. 1 and 2) whose tapered parts $h^3$ is rotatably mounted upon a corresponding shoulder $h^4$ of a stationary frame $i$.

A suitable arm $h^1$ is provided upon the upper part of the ring $h$, and serves as a stop for a stud $b^2$ mounted on the rod $b$. Upon the threaded part $b^3$ is screwed a tapped portion $c$ of a rod $c^1$ whose lower end carries the high pitch screw thread $c^2$.

A fixed nut $d$ cooperates with the threads $c^2$ and longitudinal displacement of the said threads causes an angular displacement of the rod $c^1$ which displacement is in turn transmitted through a stud $c^3$ carried thereby to a socket $e$ loosely mounted on the said rod and provided with a slot $c^4$ into which said stud projects. The socket $e$ carries the discs $f$ constituting the rotary element of a variable condenser. The stud $c^3$ is moved against one of the edges of slot $c^4$ by means of a helical spring $g$ tending to rotate the socket $e$ in order that no play may exist at any time between the said stud and socket.

In the device disclosed it is merely necessary that the radio instrumentality shown as a condenser be rotated through an angle of 180° for obtaining all possible phases of adjustment, as is well known to those skilled in the art. The following relation exists between the pitches of the actuating threads and the speed at which the knob is rotated.

$$N = \frac{p}{2p}$$

where N is the number of revolutions required to impart to the operating knob in order to produce a 180° displacement of the actuated instrumentality; P is the pitch of the threads carried by the rod actuating the socket; and $p$ is the pitch of the threads on the shaft operated by the knob. It will be obvious from the foregoing that if $p$ is made very small, N will become very large and, for example, may fall between 15 and 25 whereby a speed reduction is obtained. Rotation of the knob in the opposite direction might be arranged, by way of example, to give a speed reduction of 100 to 200.

In view of the foregoing theory the operation of the device takes place as follows:

*Speed reduction in the ratio of 100 to 200.*—Assume that the stud $b^2$ is not in contact with the arm $h^1$ of the socket $h$; if the knob $a$ is turned according to the arrow F (Fig. 1), the threaded part $b^1$ will screw upon the stationary ring $h$, so that the rod $b$ will be helically displaced, and will thus rorotate axially and will be moved vertically to a slight degree; further, the part $c$ of the rod $c^1$ will be screwed and will engage the thread $b$ by an amount equal to the difference between the pitches of the threads $b$ and $b^1$, which may be made very small.

The rod $c^1$ while it is vertically displaced will also be slightly rotated due to the engagement of the thread $c^2$ in the stationary nut $d$, and this rotation is imparted by the stud $c^3$ to the disk-carrying socket $e$, until the stud $b^2$ makes contact with the other side of the arm $h^1$.

*Speed reduction in the ratio of 15 to 25.*—Assume that the stud $b^2$ is in contact with the arm $h^1$; if the knob $a$ is rotated in the direction F, the ring $h$ will also be rotated, and the rod $b$, will turn without vertical motion; the rod $c^1$ will thus rise, at each turn of the knob $a$, by a length equal to the pitch of the thread of the shaft $b$. As in the preceding case, this ascent of the rod $c^1$ is accompanied, as above stated, by a rotary motion which is imparted to the movable portion of the condenser.

It will thus be seen that the transfer from the smaller to the greater speed reduction is entirely automatic, and is obtained by simply turning the operating knob in the opposite direction.

Under these conditions, the maximum audition of a radio outfit may be readily obtained. For this purpose, the operator first adjusts the apparatus by the direct rotation of the rod $b$ by the knob $a$, the ring $h$ being turned in this movement by means of the stud $b^2$ of the said rod, whereby the said rod will rotate without vertical motion. The disks $f$ will be rotated by the cooperation of the threaded parts $c^2$ and $b$ which serve for the speed reduction.

Upon attaining the region of audition, the device is finally adjusted by turning the knob $a$ in the opposite direction to which it was turned in the preceding case, and at this time the stud $b^2$ will be disengaged from the ring $h$ which remains stationary and the screwthreaded rod $b$, will rotate by screwing in either direction in the stationary rod $h$ whereby it assumes a slight vertical motion.

The rotation of the socket $c$ and consequently of the disks $f$ will thus be subject to a speed reduction which depends upon the ratio between the threads $b^3$ and $b^1$, and the device will thus have a differential action.

Many variations may be made in my invention by those skilled in the art without departing from the scope thereof, since

What I claim is—

1. A radio instrument control device having a main operating shaft, a rod extending through said shaft, a high pitch thread on one extremity of said rod, a stationary nut cooperating with said threads, means for feathering said shaft to said rod and rotatable means for imparting longitudinal movement to said rod for the purpose set forth.

2. A radio instrument control device having a main operating shaft, a rod extending through said shaft, a high pitch thread on one extremity of said rod, a stationary nut cooperating with said threads, means for feathering said shaft to said rod, a rotatable knob carried by the other extremity of said rod and a plurality of sets of threads for imparting longitudinal movement to said rod associated with said knob and said shaft.

3. A radio instrument control device comprising in combination, a rod, an operating sleeve feathered to said rod, means at one extremity of said rod for causing rotation of said rod when longitudinally displaced, a second rod threaded to said first mentioned rod, a collar threaded to said second rod rotatable with respect to said second rod and means for obtaining relative movement between said second rod and said collar and for subsequently causing joint rotation thereof when said second rod is rotated.

4. A radio instrument control device comprising in combination, a rod, an operating sleeve feathered to said rod, means at one extremity of said rod for causing rotation of said rod when longitudinally displaced, a second rod threaded to said first mentioned rod, a collar threaded to said second rod rotatable with respect to said second rod, a pin carried by said second rod and a tongue carried by said collar cooperating with said pin for the purpose specified.

5. A radio instrument control device comprising in combination, a rod, a manually operated knob fixed to the extremity of said rod, an outwardly projecting pin mounted on said rod, a fixed support surrounding said rod, a friction tight internally threaded ring mounted in said support, a low pitch thread on the exterior of said rod cooperating with the threads of said ring, an upstanding finger on said ring cooperating with said pin, an instrument operating shaft and means for transmitting the longitudinal displacement of said rod to said shaft, for the purpose described.

In testimony that I claim the foregoing as my invention, I have signed my name hereto.

ANTOINE BONNEFONT.